May 18, 1943.  E. C. S. CLENCH  2,319,586
END FITTING FOR FLEXIBLE HOSE
Filed Aug. 12, 1940
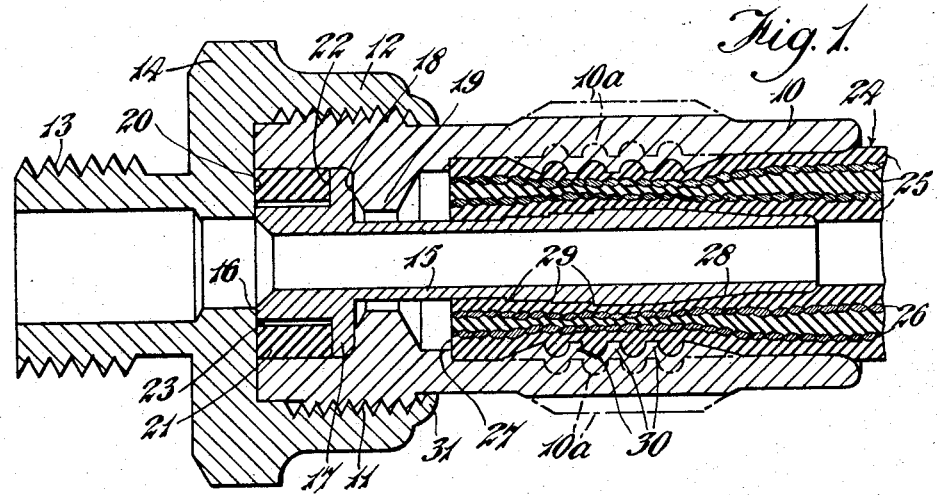
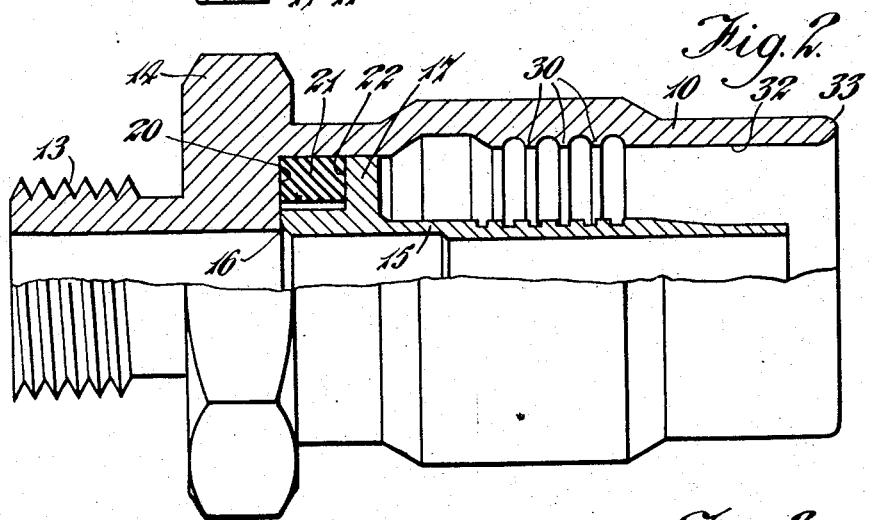
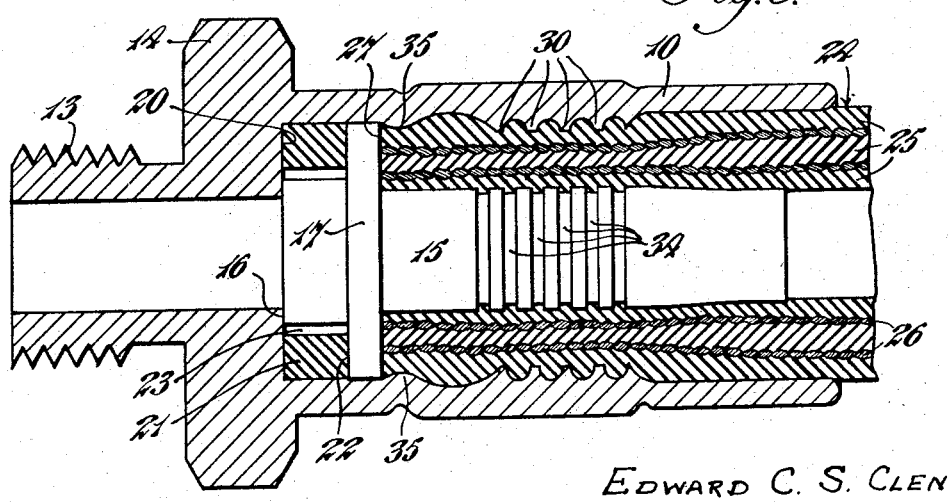
Edward C. S. Clench
INVENTOR
By— M. W. McConkey
ATTORNEY Patented May 18, 1943

2,319,586

UNITED STATES PATENT OFFICE 2,319,586

END FITTING FOR FLEXIBLE HOSES

Edward Claude Shakespeare Clench, London, England, assignor to Automotive Products Company Limited, London, England Application August 12, 1940, Serial No. 352,298
In Great Britain September 1, 1939

2 Claims. (Cl. 285—84).

This invention relates to end fittings for flexible hoses, and more particularly to those which have to withstand relatively high fluid pressures, such, for example, as are used in hydraulic braking and other liquid pressure remote control systems.

It is the primary object of the present invention to provide a form of hose end fitting in which special precautions are taken to prevent the working fluid from gaining access to the embedded reinforcement or other internal construction of the hose, as it has been found that the absorption of working liquid by fabric reinforcement tends to weaken the hose and shorten its life. It is a further object of the invention to provide an improved relatively simple construction of end fitting which is easy to apply and which produces a joint capable of withstanding exceptionally high fluid pressures.

In a hose end fitting in which the wall of the hose is squeezed between a tubular member located in the bore, and an outer sleeve, which latter carries the screw-threaded or other end fitment, the present invention is characterised by the fact that packing is provided in connection with the tubular member to prevent fluid within the hose from gaining access to the end surface of said hose.

Further, in a hose end fitting in which the wall of the hose is squeezed between a tubular member located in the bore, and an outer sleeve, which latter carries the screw-threaded or other end fitment, according to a further aspect of the invention a flange is formed externally upon the tubular member and co-operates in an axial direction with a packing ring which abuts against the end fitment and thus prevents fluid within the hose from passing around the end of said tubular member and gaining access to that end surface of said hose disposed within the end fitting.

The improved hose end fitting can comprise in combination a screw-threaded spigot or like end fitment, an outer sleeve carried thereby and arranged to be squeezed around the outside of the hose, a tubular member formed separately from the end fitment and arranged to fit within the bore of the hose, and means for providing a fluid tight joint between that end of the tubular member adjacent the end fitment, and the corresponding end of the outer sleeve, so as to prevent fluid within the hose from gaining access to the end surface of the hose disposed within the outer sleeve.

If desired a ring of soft material such as rubber may be arranged to act as packing for preventing fluid within the hose from reaching the end surface thereof and the packing ring may be compressed mechanically in an axial direction during the assembly of the fitting so that the pressure of fluid within the hose acts radially outwards to force the ring against the outer sleeve, thereby augmenting the axial compression force. The end of the tubular member can conveniently be arranged to butt against an internal shoulder carried by the outer sleeve, said tubular member being formed at a short distance from said end with an outward flange between which and the said shoulder a rubber or like packing ring is compressed in an axial direction. Preferably a clearance space exists between the interior of the packing ring and the adjacent outside surface of the tubular member when the pressure within the hose is the same as the surrounding atmosphere, i. e. when the hose and end fitting do not contain pressure fluid. The outer sleeve may be formed, intermediate its length and prior to its being attached to the hose, with a shoulder engaging with a radial flange upon the tubular member, thus positively locating the latter with respect to the outer sleeve. Further the end fitment may be formed separately from the outer sleeve and may be secured thereto by a screw thread, which latter acts to compress the packing washer or equivalent so as to secure a fluid tight joint between the outer sleeve and the tubular member. Thus the end fitment can conveniently be formed with a screw-threaded socket into which the outer sleeve is screwed, the margin of said socket being turned inwards if desired after assembly to prevent the outer sleeve from loosening. In an alternative arrangement the outer sleeve is shaped, and squeezed during assembly for gripping the hose, in such a manner as to produce an internal shoulder which positively locates a flange formed upon the outside of the tubular member. That part of the latter disposed within the hose end can be so shaped that it progressively increases in diameter in a direction towards the packing and then diminishes in diameter owing to the provision of stepped shoulders arranged to bite into the material of the hose, and thus resist withdrawal of said hose from the tubular member.

The invention is illustrated by way of example in the accompanying drawing, in which:

Figure 1 is a sectional elevation of one form of end fitting in position upon a hose;

Figure 2 is a part-sectional side elevation of a modified form of hose end fitting prior to its attachment to the hose; and Figure 3 is a sectional elevation corresponding to Figure 2 and showing the hose clamped in position.

The hose end fitting shown in Figure 1 comprises an outer sleeve 10, which is provided adjacent one end with an external screw thread 11 engaging with an internal screw-threaded socket 12 formed integrally with an end fitment 13 comprising in the present example an externally screw-threaded spigot. Obviously, however, the end fitment can take any form, depending upon the device to which the hose is to be secured. For example, the end fitment might be internally threaded, or it might take the form of a flange connection, or even one member of a union having a bayonet socket action. The end fitment 13 is provided with a flange 14 conveniently hexagonal in shape for the purpose of securing a tight joint with the aid of a spanner.

An inner tubular member 15 is disposed within the outer sleeve 10 and has, a short distance from its end 16, an outwardly extending radial flange 17 adapted to co-operate with a shoulder 18 conveniently constituted by the side of an inward radial flange 19 formed upon the outer sleeve 10. Thus an annular chamber is formed between the flange 17 and the "bottom" surface 20 of the socket member 12, and within this chamber a packing ring 21 of soft rubber or like relatively elastic material is disposed. The packing ring 21 in its natural state is of such axial length that when the parts are assembled it is compressed in an axial direction to a certain extent, thus providing an effective seal between said ring and the end surfaces 20 and 22 of the chamber. A clearance space, however, remains within the packing ring 21, as indicated at 23, in order that when the end fitting is in operation any pressure fluid which leaks between the end 16 of the tubular member 15 and the surface 20 can act outwardly upon the packing ring 21, thus increasing the sealing effect of the latter to prevent leakage of fluid past the flange 17 and also past the screw thread 11.

The hose indicated generally at 24 comprises a plurality of layers 25 of rubber and one or more layers 26 usually composed of textile reinforcement. The layers 26 extend, of course, to the cut end 27 of the hose disposed within the outer sleeve 10 and it will be seen that the provision of the packing ring effectively prevents the working fluid from gaining access to the said layers 26 of reinforcement. The outer sleeve 10 as manufactured is of the shape indicated by the broken lines at 10a so as to enable the hose 24 to be forced into position over the tubular member 15. This is shaped externally with a part 28, which smoothly increases in diameter, and thereafter the outer diameter of the tubular member 15 decreases owing to the provision of a plurality of relatively sharp steps 29 adapted to "bite" into the inner layer 25 of the hose 24. The hose 24 is securely fastened in position in the known manner by swaging or rolling the outer sleeve 10 so that the latter assumes the shape shown in Figure 1, a plurality of ribs 30 formed upon its interior being caused to "bite" into the outside of the hose 24. In order to prevent the parts of the end fitting from loosening, the "rim" portion of the socket member 12 can be rolled or peened inwards over the end of the thread 11 as indicated at 31.

In the slightly modified construction of hose end fitting shown in Figures 2 and 3 the end fitment 13 with its flange 14 is formed in one with the outer sleeve 10, and the bore 32 of the latter is so shaped initially that the inner tubular member 15, with its flange 17, can be slid into position from the open end 33 of said outer sleeve 10. A packing ring 21 composed of rubber or like soft material is, as before, compressed axially between the flange 17 and the surface 20 of the end fitment 13 when the end 16 of the tubular member 15 is forced as far as possible into engagement with said surface 20. This takes place when the hose 24 is inserted so that its wall occupies the space between the outer sleeve 10 and the tubular member 15, said outer sleeve then being rolled or swaged inwards so that it takes the form shown in Figure 3. It will be seen that ribs 30 again bite into the outer layer of the hose 24 and force the inner layer to engage intimately with a plurality of grooves 34 formed in the tubular member 15, said grooves if desired being charged with cement or adhesive prior to the insertion of the hose. Moreover the rolling or swaging operation produces an inward shoulder 35 immediately adjacent the flange 17 of the tubular member 15, and this firmly holds said member in position so that its end 16 is maintained in engagement with the surface 20. Thus the inner tubular member 15 and the outer sleeve 10 are both positively secured to the end fitment 13, with the result that they combine to produce an exceptionally firm hold upon the hose 24. As in the previous example, a space 23 exists inside the packing ring 21, so that any pressure fluid leaking past the end 16 of the tubular member 15 acts to press the packing ring 21 in an outward direction, thus augmenting the seal between the outer sleeve 10 and the flange 17.

It will be realized that the constructions described are given merely as examples and that various modifications may be made in the improved hose end fittings according to the invention. Thus it is conceivable that the requisite fluid tight joint between the inner tubular member 15 and the outer sleeve 10 might be obtained by providing a ground-in joint of frusto-conical or other form between these parts, while various types of packing might be employed.

In addition to its main advantage of preventing the working fluid from gaining access to the cut end surface of the hose, the improved fitting is exceptionally robust, and although simple in construction, is found to provide a very satisfactory grip upon high pressure hoses such as are commonly used for liquid pressure, braking, and other remote control systems.

What I claim is:

1. A hose and hose end fitting assembly comprising in combination, a hose, a screw-threaded spigot or like end fitment, an outer sleeve carried thereby and adapted to be squeezed around the outside of the hose, a tubular member formed separately from the end fitment and arranged to fit within the bore of the hose, the end of the tubular member being arranged to butt against an internal shoulder carried by the outer sleeve and said tubular member being formed at a short distance from said end with an outward flarge, and means for providing a fluid tight joint between that end of the tubular member adjacent the end fitment and the corresponding end of the outer sleeve so as to prevent fluid within the hose from gaining access to the end surface of the hose disposed within the outer sleeve, said means comprising a rubber or like packing ring compressed in an axial direction between the outward flange of the tubular member and the internal shoulder of the outer sleeve.

2. A hose and hose end fitting assembly comprising in combination, a hose, a screw-threaded spigot or like end fitment, an outer sleeve carried thereby and adapted to be squeezed around the outside of the hose, a tubular member formed separately from the end fitment and arranged to fit within the bore of the hose, the end of the tubular member being arranged to butt against an internal shoulder carried by the outer sleeve and said tubular member being formed at a short distance from said end with an outward flange, and means for providing a fluid tight joint between that end of the tubular member adjacent the end fitment and the corresponding end of the outer sleeve so as to prevent fluid within the hose from gaining access to the end surface of the hose disposed within the outer sleeve, said means comprising a rubber or like packing ring compressed in an axial direction between the outward flange of the tubular member and the internal shoulder of the outer sleeve, a clearance space being present between the interior of the packing ring and the adjacent outside surface of the tubular member when the pressure within the hose is the same as the surrounding atmosphere.

EDWARD CLAUDE
SHAKESPEARE CLENCH.